United States Patent [19]

Iovenitti

[11] Patent Number: 4,718,582

[45] Date of Patent: Jan. 12, 1988

[54] SPARE TIRE MOUNTING BRACKET FOR VAN-TYPE VEHICLE

[76] Inventor: Thomas A. Iovenitti, 8509 Whitefish, Fountain Valley, Calif. 92708

[21] Appl. No.: 17,280

[22] Filed: Feb. 24, 1987

[51] Int. Cl.[4] .............................................. P62D 43/00
[52] U.S. Cl. ................................. 224/42.21; 224/42.06
[58] Field of Search ............... 224/42.12, 42.21, 42.29, 224/42.3, 42.06; 414/463–466

[56]  References Cited

U.S. PATENT DOCUMENTS

| | | | |
|---|---|---|---|
| 1,808,983 | 6/1931 | Hebeler | 224/42.21 |
| 3,753,520 | 8/1973 | Bodde | 224/42.06 |
| 3,804,308 | 4/1974 | Bodde | 224/42.06 |
| 3,845,891 | 11/1974 | Becher | 224/42.21 |
| 4,042,157 | 8/1977 | Weiler | 224/42.21 |
| 4,249,683 | 2/1981 | Park | 224/42.12 |
| 4,282,994 | 8/1981 | Hilliard | 224/42.06 |

FOREIGN PATENT DOCUMENTS 13317 of 1907 United Kingdom ............... 224/42.3

Primary Examiner—Henry J. Recla
Assistant Examiner—Robert Petrik
Attorney, Agent, or Firm—William H. Drummond

[57]  ABSTRACT

A bracket assembly for mounting a spare tire on the rear of a van-type vehicle having double rear doors. The assembly includes a horizontal tire support bar mounted transversely on the door, a wheeled carriage movable along the tire support bar and a spare tire/wheel assembly mounted on the carriage.

The spare tire can be conveniently moved on the wheeled carriage toward the side of the van (to permit opening the other double door) or toward the inner edge of the door on which it is mounted (to permit the tire to clear the rear corner of the van when the door is fully opened).

1 Claim, 5 Drawing Figures

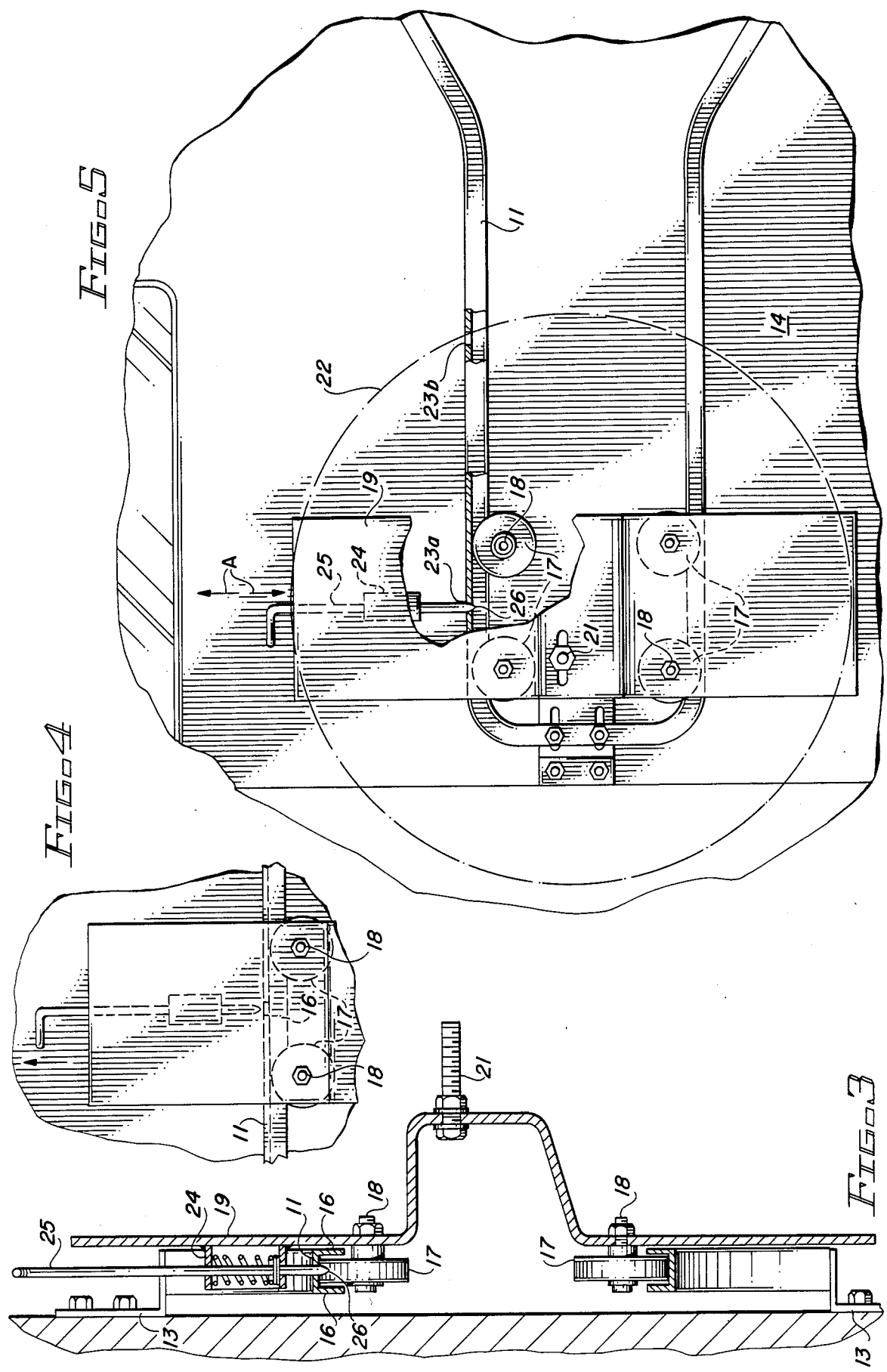

SPARE TIRE MOUNTING BRACKET FOR VAN-TYPE VEHICLE

This invention relates to a bracket for mounting a spare tire on a van-type vehicle.

More particularly, the invention concerns a spare tire mounting bracket for a van-type vehicle having rear double doors, one of which normally remains closed except when large cargo items are being stowed in or removed from the interior of the van.

In yet another aspect, the invention pertains to such mounting bracket which permits the spare tire to be moved laterally without removing the tire from the bracket.

Van-type vehicles have gained wide popularity for use in carrying passengers. According to recent developments, so-called "window vans" are provided with luxurious interior accommodations, including special sitting and sleeping arrangements, refrigerators, wet bars and the like and these "customized vans" are now widely utilized for family outings and other recreational uses.

In this configuration, it is generally necessary and desirable to carry a spare tire assembly (an inflated tire mounted on the necessary steel or aluminum wheel) at some exterior point on the vehicle. This external mounting is typically accomplished by semi-permanently mounting the spare tire on a bracket carried on the rear of the van. While some of these van-type vehicles have a single rear door, hinged at one side, the more common and popular arrangement is to provide double doors, each of which is hinged at its outer edge near the rear corners of the vehicle. These doors open outwardly from the center line of the van. When closed, these doors form a smooth continuation of the rear generally vertical wall of the van body.

In the typical double-door closure for a van body, one of the doors normally remains closed, permitting passenger ingress-egress through the other door, the normally closed door being opened only when relatively large cargo items are stowed in or removed from the van. The normally closed door is typically secured in its closed position to the frame of the van body by latch bolts which extend into the sill and plate members of the door frame. The passenger ingress-egress door is then typically secured in its closed position by a conventional automotive-type door lock, the latch member of which engages the inner edge of the normally-closed door.

The width of each of such double doors is such that a spare tire, is mounted on either of the doors, will normally either interfere with access to the door latch mechanisms (located on inner opposed edges of the doors) or, if the tire is mounted more toward the side of the vehicle (to permit convenient access to the door latches), the tire tends to contact the rear corners of the van body when the door on which it is mounted is opened, typically in the vicinity of the tail light lens.

It would be highly desirable to provide apparatus for mounting a spare tire on one of the rear doors of such a van so as to permit the tire to be easily and quickly moved laterally to either permit convenient access to the door latches (when only the passenger door is to be opened) or to permit the tire to be moved inwardly so as to clear the rear corner of the van body when both doors are open.

Therefore, the principal object of the present invention is to provide an improved spare tire mounting bracket for van-type vehicles having double rear doors.

Another object of the invention is to provide such a bracket which permits the spare tire to be quickly and conveniently moved inwardly toward the center line of the vehicle and outwardly toward the side of the vehicle without removing the tire or its carrying bracket.

These, other and further advantages of the invention will be apparent to those skilled in the art from the following detailed description thereof, taken in conjunction with the drawings, in which:

FIG. 3 is a sectional view of the mounting bracket of FIG. 1, taken along section line 3—3 thereof;

FIG. 4 is a partial elevation view of the bracket-locking assembly of the apparatus of FIGS. 1-3; and FIG. 5 is an elevation view of the apparatus of FIGS. 1-4 with the spare tire moved inwardly such that the spare tire cover (shown by dashed lines) will clear the right rear corner of the vehicle when the door is fully opened.

Briefly, in accordance with the invention, I provide a spare tire mounting bracket for a van-type vehicle having rear double doors. Such doors are hinged at their respective outer edges to the van body of the vehicle, the hinges being spaced inwardly of the opposed rear corners of the van body. The bracket comprises a generally horizontal tire support bar having an inner end and an outer end, means for fixing the ends of the support bar to one of the rear doors between the side edges thereof, a tire support carriage mounted on said bar and movable thereon between said ends, means for fixing the carriage at selected lateral positions on said support bar and means for detachably mounting a spare tire on the support carriage. The above described apparatus permits location of a mounted tire in at least two operative positions, a first location in which the inner edge of the tire is spaced outwardly from the inner edge of the rear door on which it is mounted and a second location in which the outer edge if the tire clears the rear corner of the van body when the door on which it is mounted is fully opened.

Figure 1:
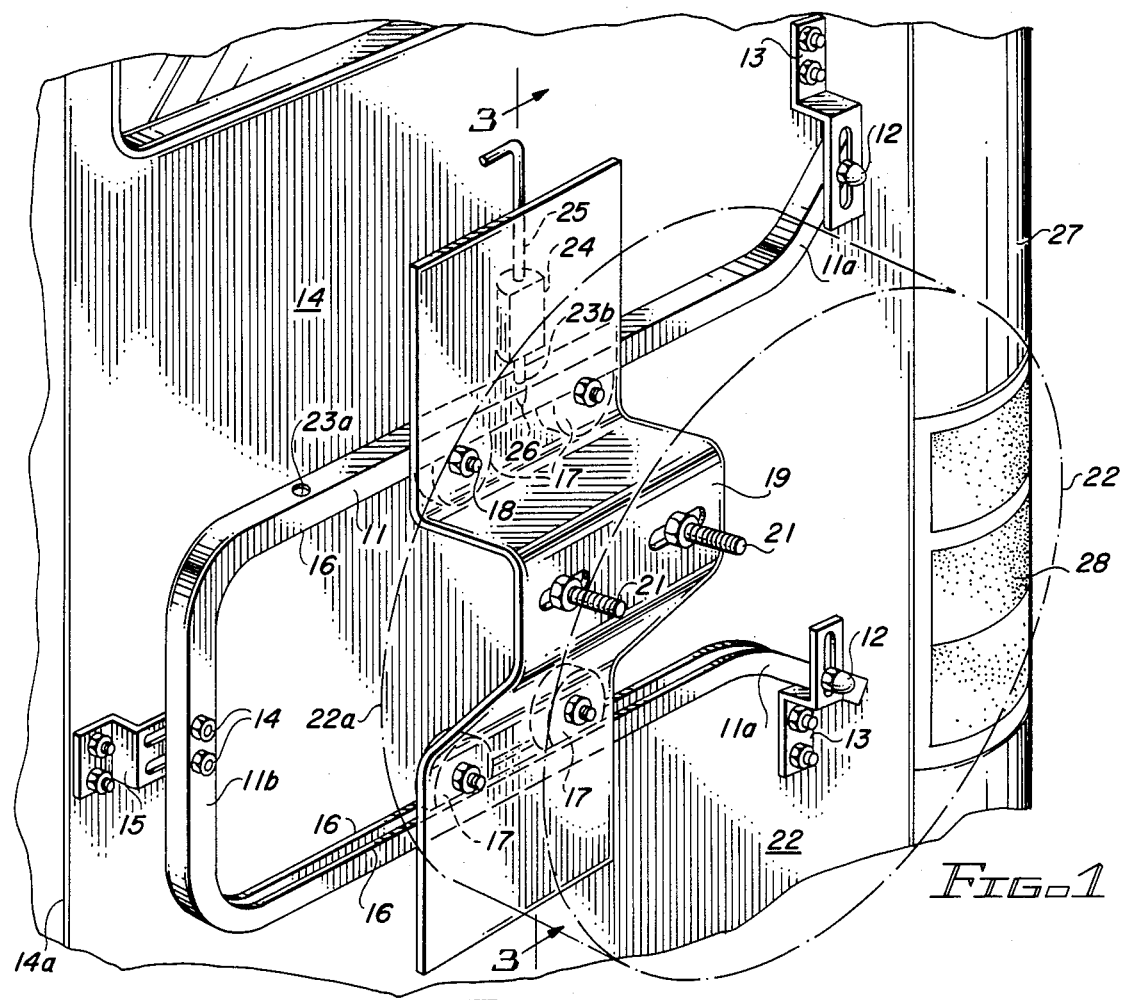
FIG. 1 is a perspective view of a spare tire mounting bracket embodying the principles of the invention, shown mounted on the right-hand rear door of a van type vehicle, with the spare tire cover shown in dashed lines.

Turning now to the drawings, in which the same reference characters identify like components in the several views, FIG. 1 is a perspective view showing a mounting bracket constructed in accordance with the invention, mounted on the right-hand door of a van vehicle body having rear double doors. As shown in FIGS. 1-5, the mounting bracket assembly includes a generally horizontal, transverse tire support bar 11 configured in a general U-shape. The open ends of the bar 11 are secured with bolts 12 to stand-off brackets 13 bolted to rear door 14. The support bar 11 is supported at its closed end 11b by bolts 14 to a stand-off bracket 15 which is also bolted to the door 14.

The bar 11 is formed of channel stock, the in-turned flanges 16 of which receive and form an operative track for rollers 17 which are rotatably carried on bolts 18 which secure the rollers 17 to a tire support carriage 19.

The carriage 19 is provided with wheel-mounting studs 21 which engage corresponding holes of a standard wheel on which the spare tire is mounted. For clarity of illustration, the details of the wheel and tire are omitted from the drawings. The position of these components is generally indicated by dashed lines 22 which illustrate a cover for a standard spare tire-wheel assembly.

As seen most clearly in FIG. 1, a plurality of holes 23a and 23b are provided in the web of the channel-shaped support bar 11. A locking device, consisting of a support bracket 24, is carried on the inner face of carriage 19, and a spring-loaded plunger rod 25 is carried in the bracket 24. The plunger rod 25 is capable of reciprocal motion as indicated by the arrows A. When the plunger 25 is raised so that the lower tip 26 thereof clears the support bracket 11, the carriage can be easily and conveniently rolled to the left (toward the inner edge of the rear door 14) and to the right (toward the rear corner 27 of the van body).

As indicated in the drawings, at least two operative positions are provided for the carriage 19 on the support bar 11. These positions include a first position in which the inner edge 22a of the tire is spaced outwardly (toward the side of the van body) from the inner edge 14a of the door 14, as seen most clearly in FIGS. 1-2. A second operative position (as indicated in FIG. 5) locates the tire 22 inwardly (toward the center line of the vehicle) which allows the tire to clear the right rear corner 27 of the van body when the door 14 is fully opened.

Figure 2:
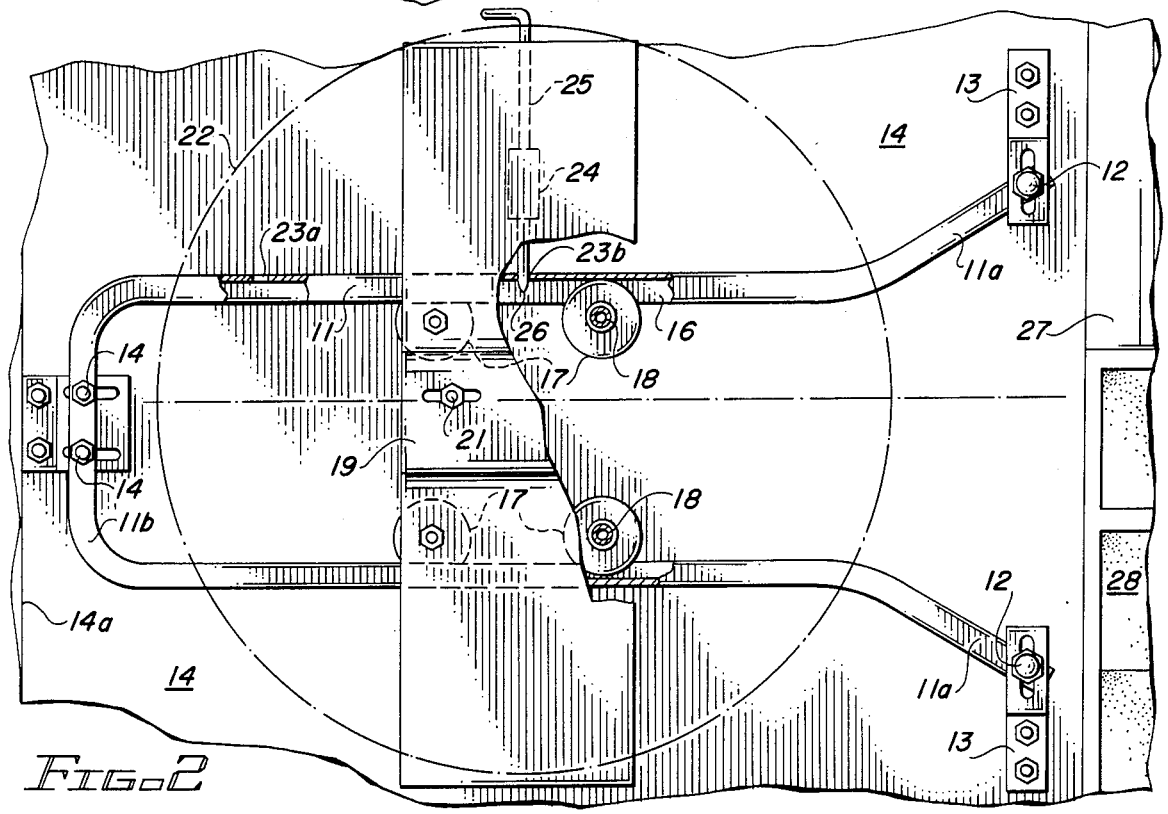
FIG. 2 is an elevation view of the mounting bracket of FIG. 1.

As will be apparent, positioning the tire as shown in FIGS. 1-2 permits one to open the left-hand rear double door of the van without it striking the tire 22. On the other hand, when it is desired to open the right-hand double door 14, the tire 22 can be moved toward the left edge 14a of the door 14 so as to clear the corner 27 of the van body, thereby preventing damage to the van body and particularly to the tail light lens 28 which are typically located on the corner 27.

Having described my invention in such terms as to enable those skilled in the art to understand and practice it and, having identified the presently preferred embodiment thereof, I claim:

1. A spare tire mounting bracket for a van-type vehicle having rear double doors, each of said double doors being hinged at their respective outer edges to the van body of said vehicle at hinges spaced inwardly of opposed rear corners of said body and to which said bracket can be mounted to store a spare tire, said bracket comprising:
    (a) an elongated tire support bar having an inner end and an outer end;
    (b) means for fixing of said support bar in generally horizontal relation to one of said doors such that the ends of said bar are adjacent the respective side edges thereof;
    (c) a tire support carriage slidably mounted on said bar and movable thereon between said inner and outer ends;
    (d) means for fixing the lateral position of said carriage on said bar at preselected locations; and
    (e) means for detachably mounting a spare tire on said support carriage such that a diametral plane of the tire is parallel to the horizontal axis of said bar,
to permit location of said mounted tire in at least two operative positions,
    said preselected locations comprise a first location at which the peripheral edge of said tire clears the inner edge of the other of said rear doors on which it is mounted, and
    a second location at which the peripheral edge of said tire overlies the inner edge of said other door but clears the rear corner of said van body when the door on which it is mounted is fully opened.

* * * * *